(12) United States Patent
Chaudhuri et al.

(10) Patent No.: US 10,547,823 B2
(45) Date of Patent: Jan. 28, 2020

(54) VIEW INTERPOLATION OF MULTI-CAMERA ARRAY IMAGES WITH FLOW ESTIMATION AND IMAGE SUPER RESOLUTION USING DEEP LEARNING

(71) Applicant: Intel Corporation, Santa Clara, CA (US)

(72) Inventors: Bindita Chaudhuri, Seattle, WA (US); Fan Zhang, San Mateo, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/141,426

(22) Filed: Sep. 25, 2018

(65) Prior Publication Data

US 2019/0045168 A1 Feb. 7, 2019

(51) Int. Cl.
*H04N 13/111* (2018.01)
*G06T 7/55* (2017.01)
*H04N 13/161* (2018.01)
*H04N 13/271* (2018.01)
*H04N 13/15* (2018.01)
*H04N 13/139* (2018.01)
*G06T 3/20* (2006.01)
*H04N 13/122* (2018.01)
*G06T 3/40* (2006.01)
*G06T 3/00* (2006.01)

(52) U.S. Cl.
CPC .............. *H04N 13/111* (2018.05); *G06T 3/20* (2013.01); *G06T 3/4053* (2013.01); *G06T 7/55* (2017.01); *H04N 13/122* (2018.05); *H04N 13/139* (2018.05); *H04N 13/15* (2018.05); *H04N 13/161* (2018.05); *H04N 13/271* (2018.05); *G06T 3/0093* (2013.01); *G06T 3/4038* (2013.01); *G06T 2207/10028* (2013.01); *G06T 2207/20081* (2013.01); *G06T 2207/20084* (2013.01); *G06T 2207/20212* (2013.01); *G06T 2207/20228* (2013.01)

(58) Field of Classification Search
CPC ................................ H04N 13/111; G06T 7/55
USPC .......................................................... 348/46
See application file for complete search history.

(56) References Cited

U.S. PATENT DOCUMENTS

2019/0139205 A1* 5/2019 El-Khamy ................ G06T 5/50

OTHER PUBLICATIONS

Brox, T. et al., "High Accuracy Optical Flow Estimation Based on a Theory for Warping", ECCV 2004.

(Continued)

*Primary Examiner* — Jeffery A Williams
(74) *Attorney, Agent, or Firm* — Green, Howard & Mughal LLP.

(57) ABSTRACT

Techniques related to interpolating an intermediate view image from multi-view images are discussed. Such techniques include downsampling first and second images that represent a view of a scene, generating a disparity map based on applying a first CNN to the downscaled first and second images, translating the downscaled first and second images using the disparity map, applying a second CNN to the translated downscaled first and second images and the disparity map to generate a downscaled intermediate image, and upscaling the downscaled intermediate image to an intermediate image at the resolution of the first and second images using an image super-resolution convolutional neural network.

24 Claims, 9 Drawing Sheets

(56) References Cited

OTHER PUBLICATIONS

Jaderberg, et al., "Spatial transformer networks", NIPS 2015.
Lai, W. et al., "Deep Laplacian Pyramid Networks for Fast and Accurate Super-Resolution", IEEE Conference on Computer Vision and Pattern Recognition (CVPR) 2017.
Meyer, S. et al., "Phase-based frame interpolation for video", IEEE Conference on Computer Vision and Pattern Recognition (CVPR) 2015.
Niklaus, S. et al., "Video Frame Interpolation via Adaptive Separable Convolution", ICCV 2017.
Xu, L. et al., "Motion Detail Preserving Optical Flow Estimation", IEEE Transactions on Pattern Analysis and Machine Intelligence (PAMI) 2012.

* cited by examiner

VIEW INTERPOLATION OF MULTI-CAMERA ARRAY IMAGES WITH FLOW ESTIMATION AND IMAGE SUPER RESOLUTION USING DEEP LEARNING

BACKGROUND

In the context of multi-view camera array images (e.g., images from two or more views of a scene), creating a sense of depth and perception in a two-dimensional static image presented to a viewer makes the image more appealing. For example, the motion parallax effect may be used to present more appealing images to a user such that a scene is captured from different viewpoints using a multi-camera array system and the intermediate views are synthesized, so that the viewer can perceive the depth information in the scene when the image is viewed from different angles.

Current techniques for synthesizing intermediate views include estimating an optical flow between image pairs and using the estimated flow to predict the intermediate image. Some optical flow techniques use naïve mathematical approaches, which provided limited accuracy, while others use patch-based approaches to predict the intermediate image, which provide good accuracy in a limited set of scenarios but are limited in the disparities they can handle and are computationally very intensive.

It may be advantageous to improve intermediate view synthesis in multi-view camera array or other multi-view contexts both in terms of accuracy and computation efficiency. It is with respect to these and other considerations that the present improvements have been needed. Such improvements may become critical as the desire to display multi-view images and intermediate synthesized images in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
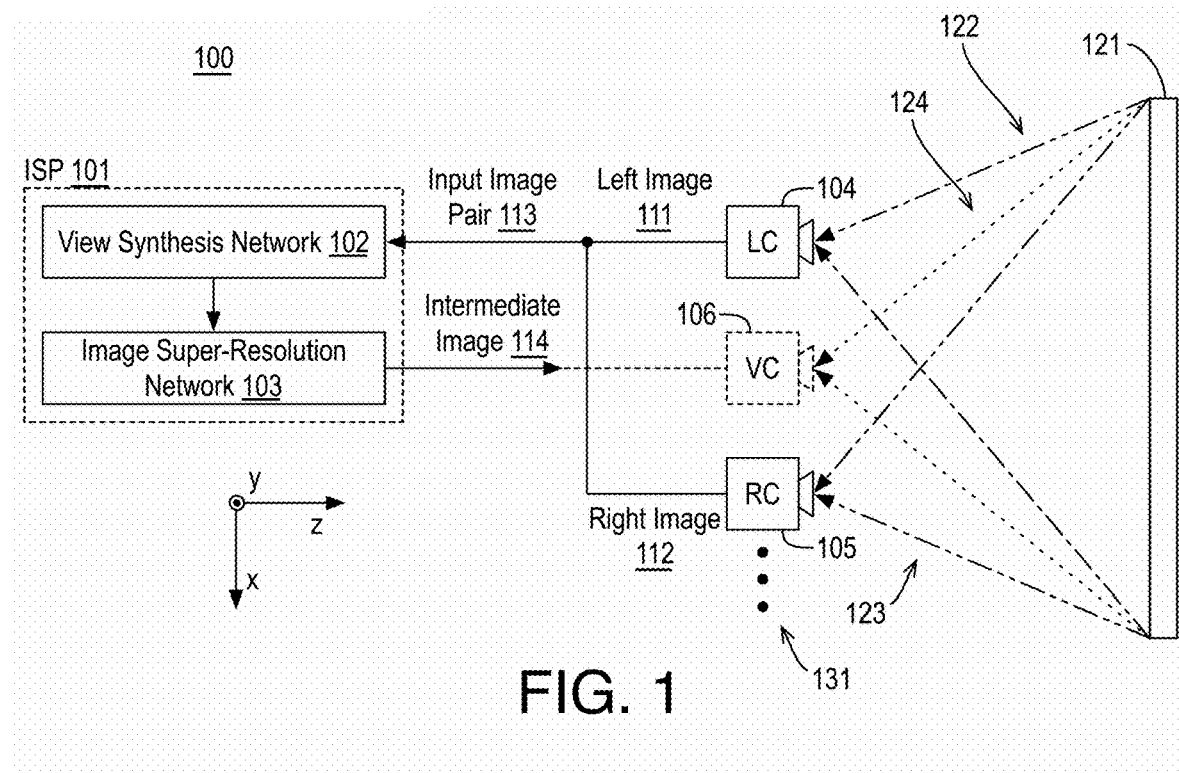
FIG. 1 illustrates an example device for generating an intermediate view from multi-view images.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to view interpolation of multi-view images to determine an intermediate image using convolutional neural networks including a view synthesis network and an image super-resolution convolutional neural network.

As described above, it may be advantageous to generate intermediate views between views of a scene. For example, first and second views of a scene (e.g., left and right views) may be attained via first and second cameras. In some contexts, it is desirable to display an intermediate view (often a view as if taken by a camera halfway between the first and second cameras. As used herein, the term intermediate image or intermediate view indicates an image or view from a perception location between the perception locations of two other images or views. For example, an intermediate image may be an image that is as if it is captured (or viewed) from a location between the image capture (or view) locations of two other images. For example, the intermediate view may be from a halfway between to other views, although any view between the other views may be implemented. By providing an intermediate view, a viewer or user may be presented more views of a scene than those attained by cameras. Such viewing causes a sense of depth and enhanced perception relative to two-dimensional static images.

In some embodiments, first and second images of a scene are attained at a first resolution such that the first and second images comprise different views of a (same) scene. The first and second images are downscaled to a second resolution less than the first resolution to generate to provide first and second downscaled images. As used herein, the term resolution indicates the number of pixels in the image such that each pixel has one or more values representative of intensity of a luma or chroma channel to provide an image. Higher resolution or greater resolution indicates more image pixels relative to lower or less resolution. Using the first and second downscaled images, at least one disparity map is generated at least in part by applying a first convolutional neural network to a first input volume comprising the first and second downscaled images. As used herein, the term convolutional neural network indicates a network that includes at least one convolutional layer, which convolves one or more filters with input feature maps to generate output feature maps. The discussed disparity map may have any suitable values or data structure to translate the first and second downscaled images to an intermediate view image. In an embodiment, applying the first convolutional neural network generates two disparity maps: one for translating the first image to the second image and a second for translating the second image to the first image. The previously discussed downscaling provides for the application of the first convolutional neural network to have increased disparity relative to the downscaled image for improved performance. In an embodiment, the first convolutional neural network is an encoder-decoder architecture convolutional neural network as is discussed further herein. In an embodiment, the first convolutional neural network is applied twice: once to the first input volume and once to an input volume including the warped or translated versions (using the discussed disparity map(s)) of the first and second downscaled images. The second application also generates one or more disparity maps, which are used to again warp or translate the (previously warped or translated) first and second downscaled images. Such repetition of the first convolutional neural network provides for advantageous error correction. Furthermore, since the same convolutional neural network is applied twice, they advantageously share memory usage.

The resultant first and second translated downscaled images (e.g., translated once or twice) and the one or more disparity maps are combined into a second input volume. A second convolutional neural network such as a volumetric convolutional neural network is applied to the second input volume to generate a resultant downscaled intermediate image representative of an interpolated view between the first and second downscaled images. The first convolutional neural network provides for image warping and the second convolutional neural network provides for color prediction. Together, the first and second convolutional neural networks provide a view synthesis network that generates a synthesized view between the first and second downscaled images at the downscaled resolution (e.g., the view synthesis network generates a downscaled intermediate image).

An intermediate image (e.g., at the first resolution of the first and second images received for processing) is generated by applying an image super-resolution convolutional neural network to the downscaled intermediate image to generate an intermediate image at a resolution higher than the downscaled intermediate image. In an embodiment, the image super-resolution convolutional neural network includes multiple adjacent convolutional layers followed by a deconvolutional layer such that the multiple adjacent convolutional layers and the deconvolutional layer generate a feature image at a resolution greater than a resolution of the downscaled intermediate image. The downscaled intermediate image is also upscaled (e.g., via bilinear upsampling with strided deconvolution) and the upscaled intermediate image and the feature image (which are at the same resolution) are combined (e.g., added) to provide an upscaled image. The upscaled image may be at the desired resolution or such processing (e.g., application of multiple adjacent convolutional layers followed by a deconvolutional layer to generate a second feature image, upscaling of the previously upscaled image, and combing of the twice upscaled image and the second feature image) may be repeated any number of times to reach the desired resolution.

The discussed view synthesis network and image super-resolution convolutional neural network may be pretrained as discussed further herein prior to implementation. The techniques discussed herein provide numerous advantages. For example, optical flow based view synthesis techniques typically require ground truth optical flow information for training, which is difficult to obtain for a large scale of data. In contrast, the view synthesis network discussed herein predicts optical flow as an intermediate step and generates the desired output image (e.g., the downscaled intermediate image) directly at the output, thereby advantageously eliminating the need for optical flow ground truth during training. Furthermore, the discussed techniques are applicable for a wide range of disparities (e.g., up to 150 to 250 pixels) in the original images due to downscaling prior to view synthesis. The resultant downscaled intermediate image is then upscaled using the super resolution network, resulting in improved available disparities and moderate to no loss in image quality.

As discussed further herein, interpolation of multi-view images to determine an intermediate image includes application of a view synthesis network and an image super-resolution convolutional neural network. The view synthesis network downscales, for example, left and right image pairs and takes the resultant downscaled left and right images as input to generate an intermediate (e.g., middle) view image as output. The view synthesis network is pretrained in an end-to-end manner using ground truth image triplets (e.g., left and right images and an intermediate image). The view synthesis network implicitly estimates optical flow and uses it in a color prediction sub-network to predict the intermediate image as discussed herein. The image super-resolution convolutional neural network upscales the intermediate image generated by the view synthesis network to the original resolution of the left and right image pair. The discussed downscaling advantageously reduces the computational cost of view interpolation more than the additional cost of upscaling using the image super-resolution convolutional neural network, resulting in net computational savings. The discussed system of networks may be deployed on any system including a mobile system with two or more cameras that can capture a scene and create an image with embedded depth information. In some embodiments, the discussed system is used as a standalone network for applications such as video interpolation, panorama generation, virtual reality content creation generation with 6 degrees of freedom (DoF), etc.

FIG. 1 illustrates an example device 100 for generating an intermediate view from multi-view images, arranged in accordance with at least some implementations of the present disclosure. As shown in FIG. 1, device 100 includes an image signal processor 101, which implements a view synthesis network 102 and an image super-resolution convolutional neural network (CNN) 103, a left camera 104, and a right camera 105. Device 100 may be implemented in any suitable form factor device such as a personal computer, a laptop computer, a tablet, a phablet, a smart phone, a digital camera, a gaming console, a wearable device, a display device, an all-in-one device, a two-in-one device, or the like. For example, device 100 may perform intermediate view interpolation as discussed herein. In some embodiments, in addition or in the alternative to left camera 104 and right camera 105, device 100 may attain multi-view images for intermediate view interpolation from memory, another device, a rendering engine, etc.

As shown, left camera 104 receives incoming light 122 from a scene 121. Left camera 104, based on exposure to incoming light 122, generates left image 111. Left camera 104 may be any suitable imaging device such as an RGB camera or the like. Similarly, right camera 105 receives incoming light 123 from scene 121 and, based on exposure to incoming light 123, generates right image 112. Left camera 104 and right camera 105 may be any suitable imaging device such as an RGB camera or the like. In some embodiments, device 100 receives left image 111 and right image 112 from another device via a communications channel (not shown). In some embodiments, left image 111 and right image 112 are attained for processing from a memory (not shown) of device 100. Left image 111 and right image 112 may include any suitable image data, picture data, frame data, or the like or any data structure representative of a picture at any suitable resolution. In an embodiment, left image 111 and right image 112 are RGB image data each having R (red), G (green), and B (blue), values for pixels thereof. In an embodiment, left image 111 and right image 112 have a resolution of 1920×1080 pixels.

Although illustrated and discussed herein with respect to left and right cameras 104, 105 and left and right images 111, 112, the techniques discussed herein may be implemented for any suitable arrangement of cameras and images. In some embodiments, cameras may be arranged above and below one another and/or images may be top and bottom images. Furthermore, device 100 is illustrated with two cameras—left and right cameras 104, 105—for the sake of clarity of presentation. However, device 100 may include any number of cameras to generate a camera array 131 with such cameras spaced out in the x-direction (to provide a horizontal camera array), the y-direction (to provide a vertical camera array), or both (to provide a camera grid) to generate any number of images. Any of such images may be paired and an intermediate image may be determined for the image pair. Thereby, any number of intermediate images may be generated. Furthermore, more than one intermediate images between such image pairs may be generated. For example, one intermediate image may be formed as if at a position halfway (or any other position) between the image pair or multiple intermediate images may be formed as if at different positions between, the image pair. Herein, without loss of generality, the images of such image pairs are typically labeled first and second or left and right images and an image interpolated therebetween is labeled an intermediate image.

As shown, image signal processor 101 receives left and right images 111, 112 as an input image pair 113 and image signal processor 101 implements view synthesis network 102 and image super-resolution CNN 103 to generate an intermediate image 114. Notably, prior to application of view synthesis network 102, left and right images 111, 112 are downscaled to a lower resolution to generate downscaled left and right images, which are processed by view synthesis network 102 to generate a downscaled intermediate image (e.g., an intermediate image at the lower resolution). The downscaled intermediate image is then processed by image super-resolution CNN 103 to generate intermediate image 114, which typically has the same resolution as left and right images 111, 112. As shown in FIG. 1, intermediate image 114 interpolates or approximates a view as if the view were attained from a virtual camera 106 (which is, of course, not a component of device 100) and received incoming light 124. Although illustrated with respect to implementation via image signal processor 101, view synthesis network 102 and image super-resolution CNN 103 (as well as a downscaling module and/or other image processing operations) may be implemented via any suitable processor or combination thereof such as central processors, graphics processors, etc.

Figure 2:
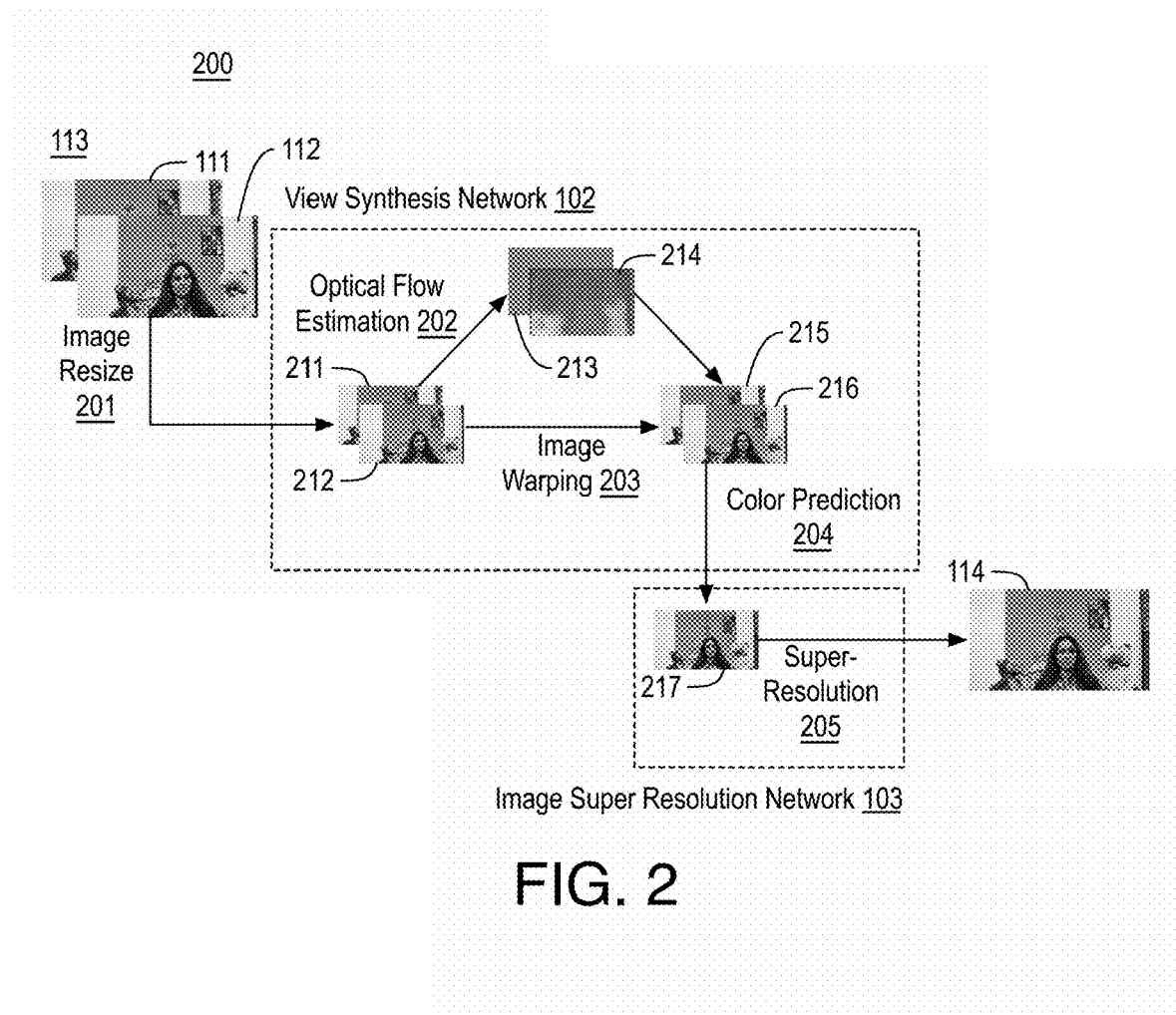
FIG. 2 illustrates an example system for generating an example intermediate view from exemplary left and right images.

FIG. 2 illustrates an example system 200 for generating an example intermediate view from exemplary left and right images, arranged in accordance with at least some implementations of the present disclosure. For example, system 200 may be implemented by image signal processor 101 of device 100. As shown in FIG. 2, system 200 includes an image resize module 201, view synthesis network 102, and image super-resolution CNN 103. Also as shown, view synthesis network 102 implements an image warping sub-network 203, which performs implicit optical flow estimation 202, and a color prediction sub-network 204. Furthermore, image super-resolution CNN 103 implements a super-resolution operation 205 to generate intermediate image 114.

As shown, system 200 receives left and right images 111, 112 (e.g., as input image pair 113) as discussed with respect to FIG. 1. Image resize module 201 downscales left and right images 111, 112 to generate left and right downscaled images 211, 212. Left and right images 111, 112 may be downscaled using any suitable technique or techniques such as downsampling techniques. Furthermore, left and right images 111, 112 may be downscaled at any suitable scaling such as by two in each dimension downscaling, by four in each dimension downscaling, etc. In an embodiment, left and right images 111, 112 are at 1920×1080 pixel resolution and left and right downscaled images 211, 212 are at 480×288 pixel resolution, although any suitable resolutions may be used. As discussed, use of left and right downscaled images 211, 212 may be advantageous relative to left and right images 111, 112 for computational and memory storage savings, reduced computational time, and increased ability to handle larger disparities.

Left and right downscaled images 211, 212 are received by view synthesis network 102, which, as discussed, includes image warping sub-network 203 and color prediction sub-network 204. In an embodiment, left and right downscaled images 211, 212 are combined into an input volume. In an embodiment, the input volume includes left and right downscaled images 211, 212 combined in a stacked manner such that each color channel of left and right downscaled images 211, 212 are aligned. In an embodiment, the input volume size is the resolution of left and right downscaled images 211, 212 by the sum of the number of color channels of left and right downscaled images 211, 212. For example, for RGB left and right downscaled images 211, 212 at 480×288 pixel resolution, the input volume may be 480×288×6 where 6 is representative of the R, G, and B channels for each of left and right downscaled images 211, 212. View synthesis network 102, which includes a convolutional neural network, generates warped or translated downscaled images 215, 216 and disparity maps 213, 214.

As used herein, the term warped or translated with respect to an image indicates an image that has been modified spatially to represent an intermediate view. Herein, the terms warped and translated are used interchangeably. For example, given a disparity map including disparity values (e.g., pixel shift values), the disparity map may warp or translate an image to a warped or translated image. In some embodiments, disparity map 213 includes disparity values to translate left downscaled image 211 to an intermediate view or to right downscaled image 212. In the former embodiment, disparity map 213 is applied to left downscaled image 211 to generate translated downscaled image 215. In the latter embodiment, half the values of disparity map 213 are applied to left downscaled image 211 to generate translated downscaled image 215. Likewise, disparity map 214 may include disparity values to translate right downscaled image 212 to an intermediate view or to left downscaled image 211 such that, in the former embodiment, disparity map 214 is applied to right downscaled image 212 and, in the latter embodiment, half the values of disparity map 214 are applied to right downscaled image 212 to generate translated downscaled image 216. In the discussed embodiments, two disparity maps 213, 214 are generated. In other embodiments, a single disparity map is generated and used to translate both left and right downscaled images 211, 212 (e.g., the single disparity map is applied in a forward direction to left downscaled images 211 and in a reverse direction to right downscaled image 212 or vice versa). An exemplary image warping sub-network 203 is discussed further herein below.

Color prediction sub-network 204 receives translated downscaled images 215, 216 and disparity maps 213, 214 (or a single disparity map). In an embodiment, translated downscaled images 215, 216 and disparity maps 213, 214 are combined into an input volume. In an embodiment, the input volume translated downscaled images 215, 216 and disparity maps 213, 214 combined in a stacked manner such that each color channel of translated downscaled images 215, 216 are aligned as are the disparity values of disparity maps 213, 214. In an embodiment, the input volume size is the resolution of translated downscaled images 215, 216 by the sum of the number of color channels of translated downscaled images 215, 216 and the number of disparity maps. For example, for RGB translated downscaled images 215, 216 at 480×288 pixel resolution and two full-resolution disparity maps, the input volume may be 480×288×8 where 8 is representative of the 6 total R, G, and B channels for translated downscaled images 215, 216 and 2 disparity value channels. Color prediction sub-network 204, which includes a convolutional neural network, generates downscaled intermediate image 217. Notably, downscaled intermediate image 217 represents an intermediate view between the views of left and right downscaled images 211, 212 and downscaled intermediate image 217 is at a lower resolution than left and right images 111, 112. Color prediction sub-network 204 may include any suitable convolutional neural network such as a volumetric neural network.

Downscaled intermediate image 217 is received by image super-resolution CNN 103, which includes a convolutional neural network as discussed further herein. Image super-resolution CNN 103 gradually upscales downscaled intermediate image 217 to intermediate image 114, which has the same resolution as left and right images 111, 112. Notably, intermediate image 114 represents an intermediate view between left and right images 111, 112 at the same resolution as left and right images 111, 112. Intermediate image 114 may be provided for presentment to a user by, for example, transmitting intermediate image 114 to a display device, storing intermediate image 114 to memory for later presentment, transferring intermediate image 114 to another device for presentment, etc.

Figure 3:
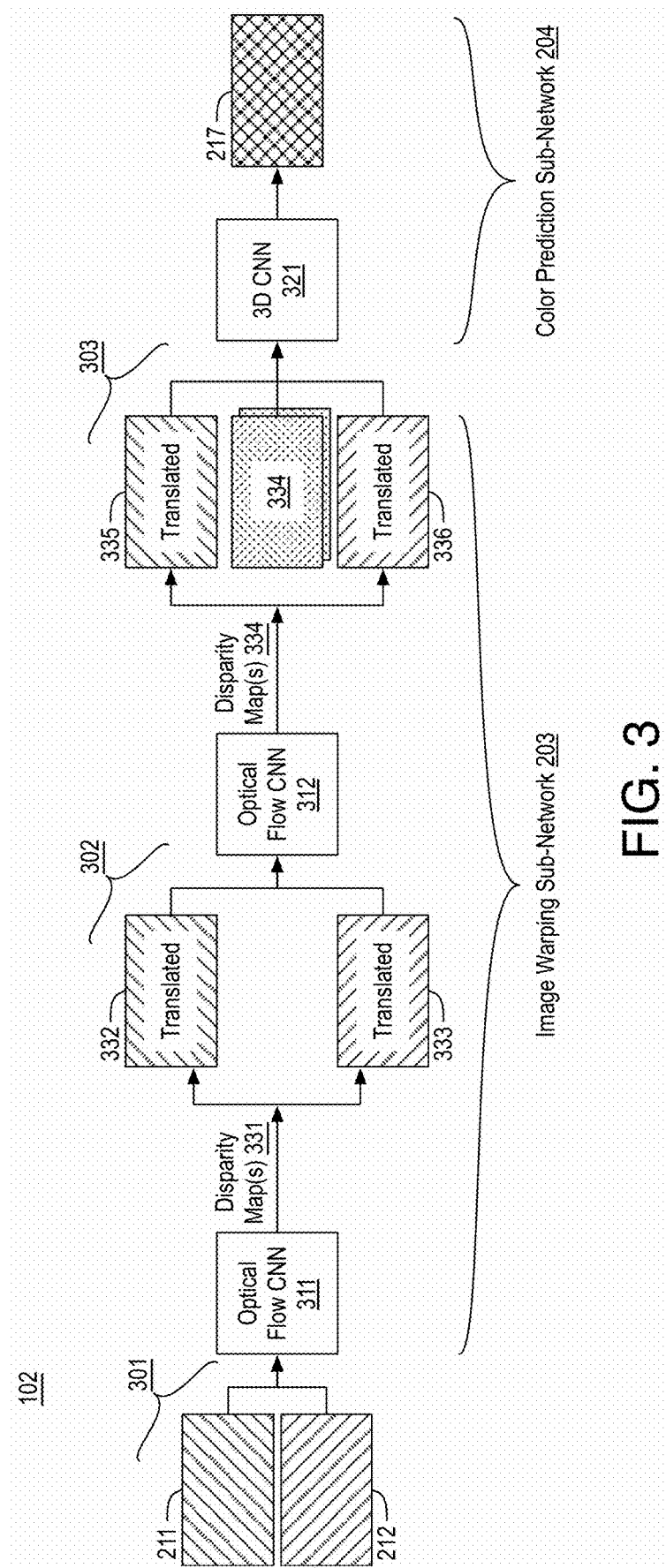
FIG. 3 illustrates an example view synthesis network including an example image warping sub-network and an example color prediction sub-network.

FIG. 3 illustrates an example view synthesis network 102 including an example image warping sub-network 203 and an example color prediction sub-network 204, arranged in accordance with at least some implementations of the present disclosure. As shown in FIG. 3, image warping sub-network 203 includes a first optical flow convolutional neural network (CNN) 311 and a second optical flow convolutional neural network (CNN) 312 and color prediction sub-network 204 includes a volumetric (3D) convolutional neural network (CNN) 321. Also as shown, view synthesis network 102 receives left and right downscaled images 211, 212.

View synthesis network 102 may combine left and right downscaled images 211, 212, as discussed above, into an input volume 301 for processing by optical flow convolutional neural network 311. For example, input volume 301 may include left and right downscaled images 211, 212 combined in a stacked manner such that each color channel of left and right downscaled images 211, 212 are aligned. That is, a depth of input volume 301 may be provided by aligning pixel values across left and right downscaled images 211, 212. As used herein, combining images and/or disparity maps in a stacked manner indicates values for pixels are aligned to provide a depth to the input volume. Optical flow CNN 311 applies a predefined CNN architecture and predefined CNN weights to left and right downscaled images 211, 212 to generate one or more disparity maps 331. As used herein relative to a CNN, the term architecture indicates the structure of the CNN with respect to the number, types, and alignment of various layers such as convolutional layers, upsampling layers, pooling layers, the connections between feature maps from such layers, and so on. The architecture of a CNN may be contrasted with the CNN weights of the CNN, which are pretrained and define the parameters applied in the architecture of the CNN. Both the architecture and the parameters or weights are predefined before implementation but, notably, the architecture is defined prior to pre-training, which determines the CNN parameters or weights.

One or more disparity maps 331 are used to translate or warp left and right downscaled images 211, 212 to provide translated left image 332 and translated right image 333. In an embodiment, one or more disparity maps 331 estimate an optical flow, $f=(\Delta x, \Delta y)$, and view synthesis network 102 warps left downscaled image 211, $I_L(x,y)$, and right downscaled image 212, $I_R(x,y)$, to generate translated left image 332 as $I_L(x+\Delta x/2, y+\Delta y/2)$ and translated right image 333 as $I_R(x-\Delta x/2, y-\Delta y/2)$. In another embodiment, disparity maps 331 include two disparity maps, one to translate left downscaled image 211 to translated left image 332 and another to translate right downscaled image 212 to translated right image 333.

Figure 4:
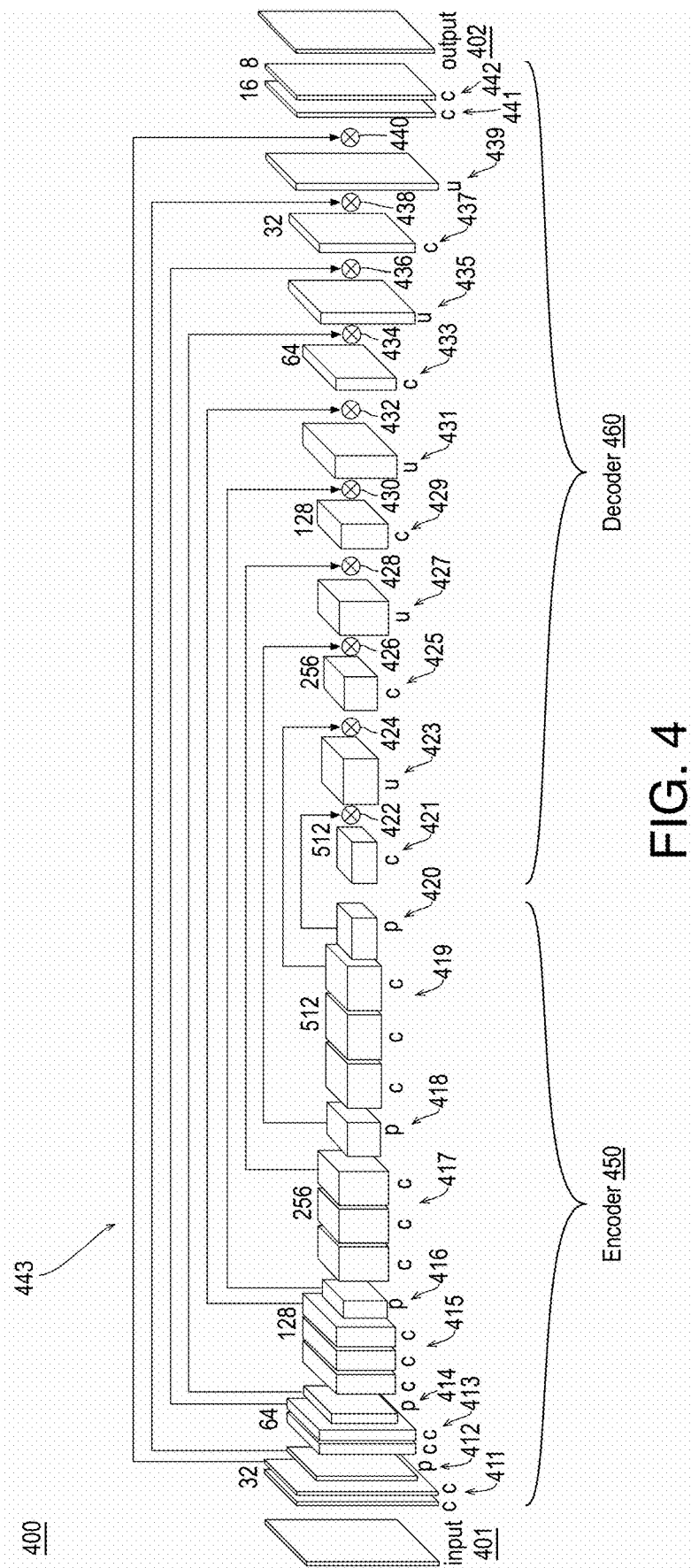
FIG. 4 illustrates an example optical flow convolutional neural network.

FIG. 4 illustrates an example optical flow convolutional neural network 400, arranged in accordance with at least some implementations of the present disclosure. For example, optical flow convolutional neural network (CNN) 400 may be implemented as optical flow CNN 311, optical flow CNN 312, or both. As shown in FIG. 4, optical flow CNN 400 receives input 401 and includes an encoder portion 450 and a decoder portion 460. Input 401 may be any suitable input or input volume discussed herein such as input volume 301 or input volume 302. Encoder portion 450 extracts features at different resolutions from input 401 with the effective receptive field (e.g., proportional to the number of consecutive convolution layers) decreasing with decrease in resolution. Decoder portion 460 combines the extracted features using skip connections 443 from corresponding layers in encoder portion 450 to estimate the optical flow at each pixel (e.g., (x,y)) in the horizontal and vertical directions. Skip connections 443 from both pooling layers 412, 414, 416, 418, 420 (e.g., the outputs of pooling layers 412, 414, 416, 418, 420) and the final convolutional layers of convolutional layer groupings 411, 413, 415, 417, 419 (e.g., the convolutional layer outputs) propagate low level image details to higher levels for improved optical flow prediction without supervision during training. Notably, optical flow CNN 400 generates output 402, which may include one or more disparity maps as discussed herein with respect to, for example, disparity maps 331 and disparity maps 334.

Furthermore, optical flow CNN 400 is an encoder-decoder convolutional neural network including encoder portion 450 and a decoder portion 460 such that encoder portion 450 generates feature maps that are fed forward to decoder portion 460, which connects them to outputs of decoder portion 460. That is optical flow CNN 400 has an encoder network (e.g., encoder portion 450) to map inputs to feature representations (e.g., feature maps) and a decoder network (e.g., decoder portion 460) to take the feature representations (e.g., feature maps) as input via skip connections 443, process them and produce an output. In the context of optical flow CNN 400, the encoder-decoder convolutional neural network includes encoder portion 450 having encoder layers to extract features (e.g., feature maps) from input volume at differing resolutions (e.g., reducing moving through encoder portion 450) and decoder portion 460 to combine the extracted features (e.g., feature maps) using skip connections 443 corresponding to ones of the encoder layers to estimate optical flow.

In FIG. 4, layers are labeled such that the label c indicates a convolutional layer (and ReLU), the label p indicates a pooling layer (e.g., 2×2 max pooling although any pooling techniques may be used), and the label u indicates an upsampling layer (e.g., 2×2 upsampling although any suitable upsampling size may be used). For example, a convolutional layer may include n k×k convolutions followed by rectified linear unit (ReLU) operations such as leaky ReLU (e.g., with slope 0.2) operations. In some embodiments, a convolutional layer may also include scaling operations.

For example, convolutional layer grouping 411 may include two 32 (e.g., n=32) 3×3 (e.g., k=3) convolutional layers. For example, at the first convolutional layer, multiple convolution filters or kernels are applied to input 401. Such convolution filters or kernels are convolved with input 401. For example, the multiple convolution filters or kernels applied at convolutional layer 302 may include 32 3×3 convolution filters (e.g., with each convolution filter associated with one of the 32 resultant feature maps) having a stride of 2 (although any suitable stride may be used). Each convolutional layer may generate feature maps that are representative of extracted features. Furthermore, convolutional layer grouping 411 is followed by pooling layer 412, which performs pooling (e.g., max pooling) to generate a feature map at a lower resolution with respect to the feature map generated by convolutional layers of convolutional layer grouping 411.

As shown, convolutional layer grouping 413 may include two 64 (e.g., n=64) 3×3 (e.g., k=3) convolutional layers such that, at the first convolutional layer, multiple convolution filters or kernels are applied to the output of pooling layer 412. As discussed, each convolutional layer may generate feature maps that are representative of extracted features. Such features may become more abstract moving through optical flow CNN 400. Convolutional layer grouping 413 is followed by pooling layer 414, which performs pooling (e.g., max pooling) to generate a feature map at a lower resolution. The output of pooling layer 414 is provided to convolutional layer grouping 415, which applies, for example, three 128 (e.g., n=128) 3×3 (e.g., k=3) convolutional layers such that each convolutional layer may generate feature maps that are representative of extracted features. Convolutional layer grouping 415 is followed by pooling layer 416, which performs pooling (e.g., max pooling) to generate a feature map at a lower resolution.

Similarly, the output of pooling layer 416 is provided to convolutional layer grouping 417, which applies, for example, three 256 (e.g., n=256) 3×3 (e.g., k=3) convolutional layers such that each convolutional layer may generate feature maps representative of extracted features and convolutional layer grouping 417 is followed by pooling layer 418, which performs pooling (e.g., max pooling) to generate a feature map at a lower resolution. Furthermore, the output of pooling layer 418 is provided to convolutional layer grouping 419, which applies, for example, three 512 (e.g., n=512) 3×3 (e.g., k=3) convolutional layers such that each convolutional layer may generate feature maps representative of extracted features and convolutional layer grouping 419 is followed by pooling layer 420, which performs pooling (e.g., max pooling) to generate a feature map at a lower resolution.

As shown, pooling layer 420 is followed by a convolutional layer 421, which applies, for example, a 256 (e.g., n=256) 3×3 (e.g., k=3) convolutional layer to generate feature maps. The resultant feature maps are combined, at connection 422 with the output (e.g., feature maps) from pooling layer 420. Connections 422, 424, 426, 428, 430, 432 434, 436, 438, 440 combine the relevant feature maps using any suitable technique or techniques such as addition, concatenation, channel wise concatenation, or the like. The resultant feature maps from connection 422 are upsampled (e.g., 2×2 upsampled) at upsampling layer 423. The feature maps from upsampling layer 423 are combined, at connection 424, with the output feature maps from the final convolutional layer of convolutional layer grouping 419.

The resultant feature maps from connection 424 are provided to convolutional layer 425, which applies, for example, a 256 (e.g., n=256) 3×3 (e.g., k=3) convolutional layer. The feature maps from convolutional layer 425 are combined, at connection 426, with the output feature maps from pooling layer 418. The resultant feature maps from connection 426 are upsampled (e.g., 2×2 upsampled) at upsampling layer 427. The feature maps from upsampling layer 427 are combined, at connection 428, with the output feature maps from the final convolutional layer of convolutional layer grouping 417.

The resultant feature maps from connection 428 are provided to convolutional layer 429, which applies, for example, a 128 (e.g., n=128) 3×3 (e.g., k=3) convolutional layer and the feature maps from convolutional layer 429 are combined, at connection 430, with the output feature maps from pooling layer 416. The resultant feature maps from connection 430 are upsampled (e.g., 2×2 upsampled) at upsampling layer 431. The feature maps from upsampling layer 431 are combined, at connection 432, with the output feature maps from the final convolutional layer of convolutional layer grouping 415. The resultant feature maps from connection 432 are provided to convolutional layer 433, which applies, for example, a 64 (e.g., n=64) 3×3 (e.g., k=3) convolutional layer and the feature maps from convolutional layer 433 are combined, at connection 434, with the output feature maps from pooling layer 414. The resultant feature maps from connection 434 are upsampled (e.g., 2×2 upsampled) at upsampling layer 435. The feature maps from upsampling layer 435 are combined, at connection 436, with the output feature maps from the final convolutional layer of convolutional layer grouping 413. The resultant feature maps from connection 436 are provided to convolutional layer 437, which applies, for example, a 32 (e.g., n=32) 3×3 (e.g., k=3) convolutional layer and the feature maps from convolutional layer 437 are combined, at connection 438, with the output feature maps from pooling layer 412. The resultant feature maps from connection 438 are upsampled (e.g., 2×2 upsampled) at upsampling layer 439. The feature maps from upsampling layer 439 are combined, at connection 440, with the output feature maps from the final convolutional layer of convolutional layer grouping 411.

The resultant feature maps from connection 440 are provided to convolutional layer 441, which applies, for example, a 16 (e.g., n=16) 3×3 (e.g., k=3) convolutional layer and the feature maps from convolutional layer 441 are provided to convolutional layer 442. Convolutional layer 442 applies, for example, an 8 (e.g., n=8) 3×3 (e.g., k=3) convolutional layer and the feature maps from convolutional layer 442 are provided to an output layer to generate output 402.

Returning now to FIG. 3, as shown, view synthesis network 102 may combine translated left and right images 332, 333 into an input volume 302 for processing by optical flow convolutional neural network 312. In an embodiment, input volume 302 includes translated left and right images 332, 333 combined in a stacked manner such that each color channel of translated left and right images 332, 333 are aligned. In an embodiment, a size of input volume 302 is the resolution of translated left and right images 332, 333 by the sum of the number of color channels of translated left and right images 332, 333 such as, for example, for RGB translated left and right images 332, 333 at 480×288 pixel resolution, a size of 480×288×6 where 6 is representative of the R, G, and B channels for each of translated left and right images 332, 333.

Optical flow CNN 312 receives input volume 302 and optical flow CNN 312 applies a predefined CNN architecture and predefined CNN weights to translated left and right images 332, 333 to generate one or more disparity maps 334. As discussed with respect to disparity maps 331 and left and right downscaled images 211, 212, one or more disparity maps 334 are used to translate or warp translated left and right images 332, 333 to provide (twice) translated left image 335 and (twice) translated right image 336. In an embodiment, one or more disparity maps 334 estimate an optical flow, $f=(\Delta x, \Delta y)$, and view synthesis network 102 warps translated left images 332, $I_L(x,y)$, and translated right images 333, $I_R(x,y)$, to generate translated left and right images 335, 336 as $I_L(x+\Delta x/2, y+\Delta y/2)$ and $I_R(x-\Delta x/2, y-\Delta y/2)$, respectively. In another embodiment, disparity maps 334 include two disparity maps, one to translate translated left image 332 to translated left image 335 and another to translate translated right images 333 to translated right image 336.

Optical flow CNN 312 may implement any suitable CNN. In an embodiment, optical flow CNN 312 implements optical flow CNN 400 as discussed with respect to FIG. 4. In an embodiment, optical flow CNN 311 and optical flow CNN 312 implement the same CNN architecture and different CNN parameters. In an embodiment, optical flow CNN 311 and optical flow CNN 312 implement the same CNN architecture and CNN parameters. Such implementation of the same CNN architecture and CNN parameters offers advantages such as optical flow CNN 312 correcting for errors in optical flow estimation and warping in the outputs of optical flow CNN 311 and due to architecture and parameter sharing, the memory requirement in implementation is advantageously reduced.

With continued reference to FIG. 3, view synthesis network 102 may combine translated left and right images 335, 336 and one or more disparity maps 334 into an input volume 303 for processing by 3D CNN 321. In an embodiment, input volume 303 includes translated left and right images 335, 336 and one or more disparity maps 334 combined in a stacked manner such that each color channel of translated left and right images 335, 336 and each of disparity maps 334. In an embodiment, a size of input volume 303 is the resolution of translated left and right images 335, 336 by the sum of the number of color channels of translated left and right images 335, 336 and the number of disparity maps 334. In an embodiment, for RGB translated left and right images 335, 336 at 480×288 pixel resolution, input volume 303 has a size of 480×288×8 where 8 is representative of the R, G, and B channels for each of translated left and right images 335, 336 and 2 disparity maps. In an embodiment, for RGB translated left and right images 335, 336 at 480×288 pixel resolution, input volume 303 has a size of 480×288×7 where 7 is representative of the R, G, and B channels for each of translated left and right images 335, 336 and 1 disparity map.

3D CNN 321 receives input volume 303 and 3D CNN 321 applies a predefined CNN architecture and predefined CNN weights to input volume 303 (e.g., translated left and right images 335, 336 and disparity map(s) 334) to generate downscaled intermediate image 217. 3D CNN 321 may be any suitable CNN such as a volumetric or 3D CNN having any number of feature extraction layers. In an embodiment, each 3D convolutional layer of 3D CNN 321 implements a number n of k×k×k 3D filters or kernels such that, for example k=3 in some embodiments. For example, each 3D convolutional layer of 3D CNN 321 may apply 3×3×3 filters, kernels, or matrices. Implementation of 3D CNN 321 accurately predicts pixel values for downscaled intermediate image 217 (e.g., the final output of 3D CNN 321) particularly around occlusion boundaries by combining, in input volume 303, information from translated left and right images 335, 336 (e.g., the two warped images) and disparity map(s) 334 (e.g., the predicted optical flow).

As discussed, and with reference to FIG. 2, downscaled intermediate image 217 is received by image super-resolution CNN 103, which gradually upscales downscaled intermediate image 217 to intermediate image 114 (e.g., at the same resolution as left and right images 111, 112).

Figure 5:
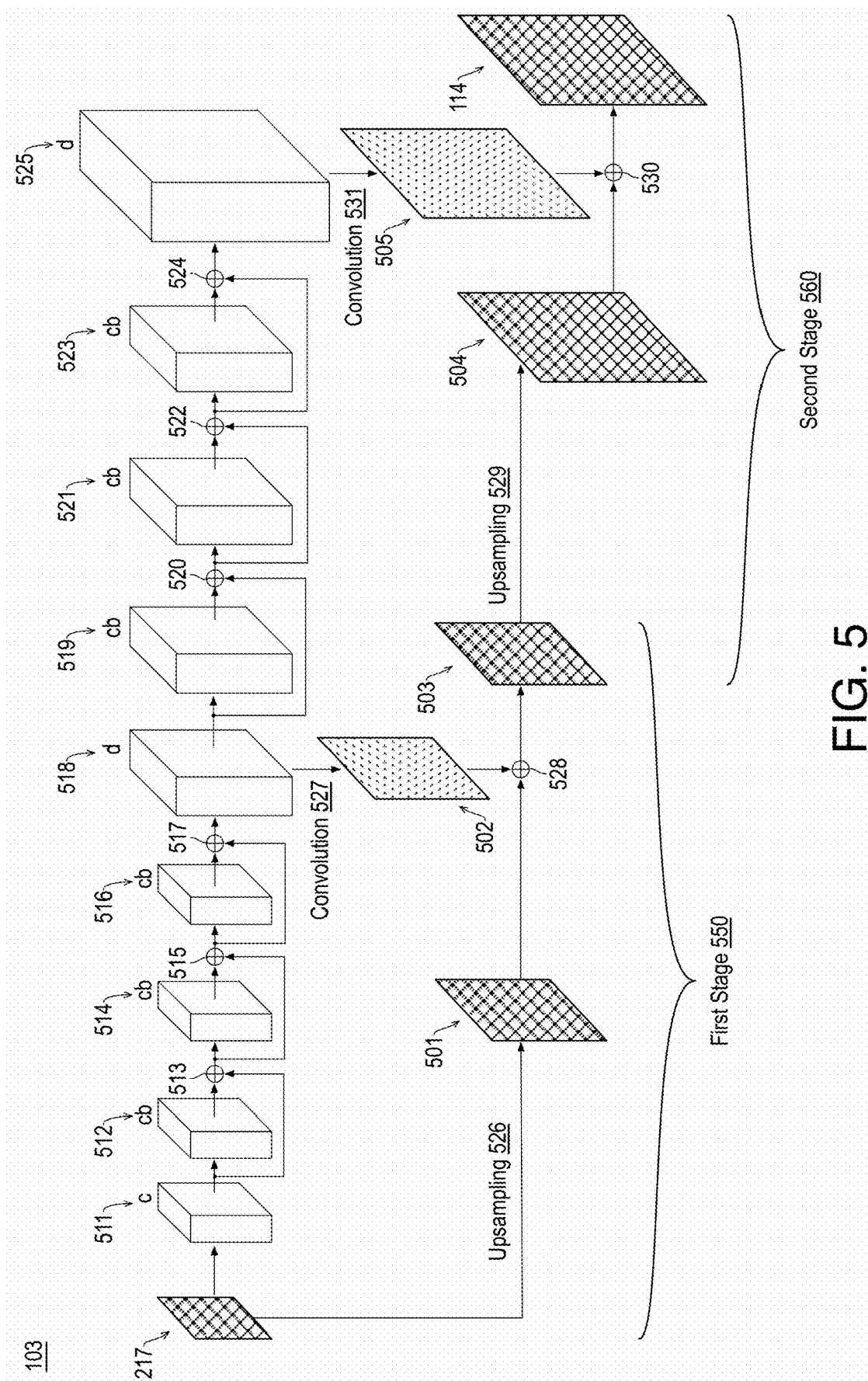
FIG. 5 illustrates an example image super-resolution convolutional neural network.

FIG. 5 illustrates an example image super-resolution convolutional neural network 103, arranged in accordance with at least some implementations of the present disclosure. As shown in FIG. 5, image super-resolution convolutional neural network (CNN) 103 receives downscaled intermediate image 217 and generates intermediate image 114. Image super-resolution CNN 103 includes multiple stages such as first stage 550 and second stage 560. Although illustrated with respect to two stages 550, 560, image super-resolution CNN 103 may implement any number of stages. Notably, image super-resolution CNN 103 has a Laplacian pyramid architecture that advantageously breaks down the learning task into multiple stages 550, 560 with increasing scaling such that the input (e.g., downscaled intermediate image 217) is gradually upscaled to the desired high resolution with minimum error at each of stage 550, 560 and such that the same network may be used to obtain upscaled images at different resolutions.

As shown, first stage 550 includes a convolutional layer 511, convolutional blocks 512, 514, 516, adders 513, 515, 517, deconvolutional layer 518 (including leaky ReLu), convolutional layer 527, upsampling module 526, and adder 528. Similarly, second stage 560 includes convolutional blocks 519, 521, 523, adders 520, 522, 524, deconvolutional layer 525 (including leaky ReLu), convolutional layer 531, upsampling module 529, and adder 530. Each of stages 550, 560 includes a stack of convolutional layers followed by a deconvolutional layer, the output of which (e.g., feature images 502, 505) is added (e.g., via adders 528, 530) with the input (e.g., downscaled intermediate image 217 at the appropriate scaling) to get the final output (e.g., intermediate image 114). Since the low level details of both the high resolution and low resolution images remain the same, image super-resolution CNN 103, during training, only learns the difference between the images as represented by feature images 502, 505. As used herein, the term feature image indicates an image having image difference information such that a feature image may not generate a fully formed image. As shown, convolutional layers of image super-resolution CNN 103 are separated into blocks (e.g., convolutional blocks 512, 514, 516, 519, 521, 523) of any number of convolutional layers such as five convolutional layers. In an embodiment, blocks within each stage share the same weights among them (e.g., to advantageously reduce memory requirement) and adders 513, 515, 517, 520, 522, 524 provide residual connections between the blocks to retain and propagate the fine details. The stride of the deconvolutional layers 518, 525 determines the scaling factor of intermediate image 114 with respect to downscaled intermediate image 217. In some embodiments, the stride of deconvolutional layers 518, 525 is two each, for a net scaling factor of 4.

As with FIG. 4, in FIG. 5, layers and blocks are labeled such that the label c indicates a convolutional layer (and ReLU), the label cb indicates convolutional layer block including a number of adjacent convolutional layers, and the label d indicates a deconvolutional layer (e.g., having a stride of 2). For example, a convolutional layer may include n k×k convolutions followed by rectified linear unit (ReLU) operations. In some embodiments, a convolutional layer may also include scaling operations.

As shown, convolutional layer 511 receives downscaled intermediate image 217. In an embodiment, downscaled intermediate image 217 is an RGB image. In an embodiment, downscaled intermediate image 217 is a luma-channel only image. For example, downscaled intermediate image 217 may be converted from RGB to a color channel having a luma component (e.g., YCbCr or YUV) and the chroma component (Y) may be isolated for processing. Convolutional layer applies a convolutional layer to generate feature maps. The convolutional layer may apply any number, n, of any size, k×k, convolutional filters as discussed herein. For example, 3×3 filters may be applied.

The resultant feature maps are provided to convolutional block 512 and adder 513. As discussed, convolutional block 512 includes a number (e.g., 5) of adjacent convolutional layers that are applied to the resultant feature maps to generate feature maps from convolutional block 512. For example, convolutional block 512 may include a stack of convolutional layers. As shown, the feature map from convolutional layer 511 and the feature maps from convolutional block 512 are added (e.g., via element-wise summation) at adder 513. For example, adder 513 provides residual connection by adding feature maps from convolutional layer 511 feature maps from convolutional block 512. Such residual connections may provide for image super-resolution CNN 103 to estimate changes in features, which may make training easier.

The feature maps from adder 513 are provided to adder 515 and convolutional block 514, which includes a number (e.g., 5) of adjacent convolutional layers that are applied to the feature maps from adder 513 to generate feature maps. The feature maps from convolutional block 514 and adder 513 are added (e.g., via element-wise summation) at adder 515. The feature maps from adder 515 are provided to adder 517 and convolutional block 516, which includes a number (e.g., 5) of adjacent convolutional layers that are applied to the feature maps from adder 515 to generate feature maps. The feature maps from convolutional block 516 and adder 515 are added (e.g., via element-wise summation) at adder 517.

The feature maps from adder 515 are provided to deconvolutional layer 518, which performs a deconvolution (e.g., upsampling using deconvolution filters) on the feature maps and the resultant feature maps are provided to convolution module 527, which performs a convolution, to generate feature image 502. As shown, feature image 502 is at an increased resolution with respect to downscaled intermediate image 217. In an embodiment, feature image 502 is at a higher resolution than downscaled intermediate image 217 but a lower resolution than intermediate image 114 (and left and right images 111, 112, please see FIG. 1).

Furthermore, downscaled intermediate image 217 is upscaled or upsampled using any suitable technique or techniques via upsampling module 526 to generate an image 501 at the same resolution as feature image 502. Downscaled intermediate image 217 may be upscaled using any suitable technique or techniques such as bilinear upsampling with strided deconvolution, bicubic interpolation, or the like.

Image 501 is combined with feature image 502 at adder 528 to generate an intermediate image 503. As discussed, intermediate image may be at a higher resolution than downscaled intermediate image 217 but a lower resolution than intermediate image 114. In some embodiments, intermediate image 503 may be provided as an output image. In an embodiment, intermediate image 503 is at the desired resolution and only first stage 550 may be used to generate intermediate image 114.

Alternatively, second stage 560 may be applied to generate intermediate image 114 as illustrated in FIG. 5. As shown, the feature maps from deconvolutional layer 518 are provided to convolutional block 519 and adder 520. Convolutional block 519 includes a number (e.g., 5) of adjacent convolutional layers that are applied to the feature maps to generate feature maps. The feature map from convolutional block 519 and the feature maps from deconvolutional layer 518 are added (e.g., via element-wise summation) at adder 520.

The feature maps from adder 520 are provided to adder 522 and convolutional block 521, which includes a number (e.g., 5) of adjacent convolutional layers that are applied to the feature maps from adder 520 to generate feature maps. The feature maps from convolutional block 521 and adder 520 are added (e.g., via element-wise summation) at adder 522. The feature maps from adder 522 are provided to adder 524 and convolutional block 523, which includes a number (e.g., 5) of adjacent convolutional layers that are applied to the feature maps from adder 522 to generate feature maps. The feature maps from convolutional block 523 and adder 522 are added (e.g., via element-wise summation) at adder 524.

The feature maps from adder 524 are provided to deconvolutional layer 525, which performs a deconvolution (e.g., upsampling using deconvolution filters) on the feature maps and the resultant feature maps are provided to convolution module 527, which performs a convolution, to generate feature image 505. Feature image 505 is at an increased resolution with respect to downscaled intermediate image 217 and intermediate image 503. In an embodiment, feature image 505 is at of left and right images 111, 112, please see FIG. 1 (e.g., a desired resolution of intermediate image 114).

Intermediate image 503 is upscaled or upsampled using any suitable technique or techniques (e.g., bilinear upsampling with strided deconvolution, bicubic interpolation, or the like) via upsampling module 529 to generate an image 504 at the same resolution as feature image 505. Image 504 is combined with feature image 505 at adder 530 to generate intermediate image 114. In some embodiments, intermediate image 114 is generated via a third or fourth stage of image super-resolution CNN 103, which include components as discussed with respect to stages 550, 560. In some embodiments, the intermediate image generated by image super-resolution CNN 103 is a luma channel only image. In an embodiment, intermediate image 114 is generated from an intermediate image generated from the image super-resolution CNN 103 (e.g., a Y channel only) by upscaling the chroma channels (e.g., UV or CrCb) of downscaled intermediate image 217 using any suitable technique or techniques such as bicubic interpolation), combining the channels into a color space image having a luma channel (e.g., into a YUV or YrCb image) and converting the color space image having a luma channel to an RGB image or any other suitable color space.

Figure 6A:
FIGS. 6A, 6B, 6C, and 6D illustrate an example right input image, an example left input image, an example disparity map, and an example intermediate image generated using the techniques discussed herein, respectively.

FIGS. 6A, 6B, 6C, and 6D illustrate an example right input image, an example left input image, an example disparity map, and an example intermediate image generated using the techniques discussed herein, respectively, arranged in accordance with at least some implementations of the present disclosure. In FIG. 6A, left image 111 shows an example image of a scene attained by a left camera and, in FIG. 6B, right image 112 shows an example image of the scene attained by a right camera aligned vertically with the left camera as discussed with respect to FIG. 1. As discussed, any number of images and cameras of a scene may be attained and intermediate images therebetween may be generated using the techniques discussed herein. In an embodiment, a multi-camera system includes of a linear array of cameras (e.g., up to 15 HD cameras or more) that are equally spaced from each other. The cameras capture images of the scene from different viewpoints spanning over a wide field of view (FOV). The techniques discussed herein address the problem of synthesizing images at intermediate viewpoints using the captured images such that, for example, when a viewer moves their head, they may view the captured scene smoothly from any angle within the FOV of the system.

Figure 6B:
Figure 6C:
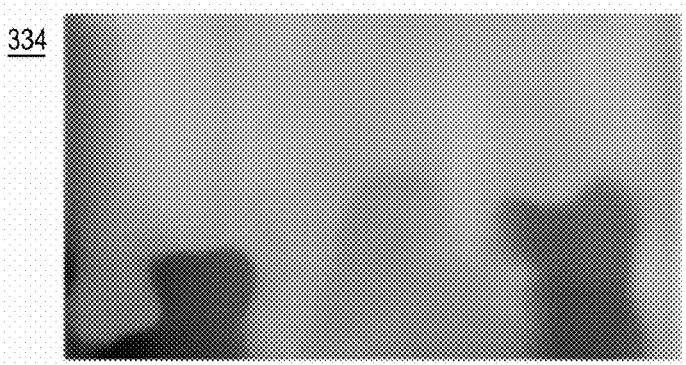

In the examples of FIGS. 6A and 6B, the disparity between left image 111 and right image 112 is in the range of 60 to 250 pixels (e.g., 15-60 pixels after downsampling to left and right downscaled images 211, 212). FIG. 6C illustrates example disparity map 334 generated by image warping sub-network 203. In the illustration of FIG. 6C, darker pixels represent larger disparity values while lighter pixels represent smaller pixel values.

Figure 6D:

FIG. 6D illustrates example intermediate image 114 generated via system 200. As shown, view synthesis network and image super-resolution CNN 103 provide an intermediate image (e.g., a predicted middle image) with visibly negligible artifacts and blurriness. In contrast, previous techniques exhibit substantial artifacts, particularly at occlusion boundaries, and, in some cases, provide entirely blurred images. Furthermore the optical flow estimation exhibited by FIG. 6C, which is advantageously trained without ground truth data, compares favorably to optical flow estimation techniques that utilize ground truth data.

Figure 7:
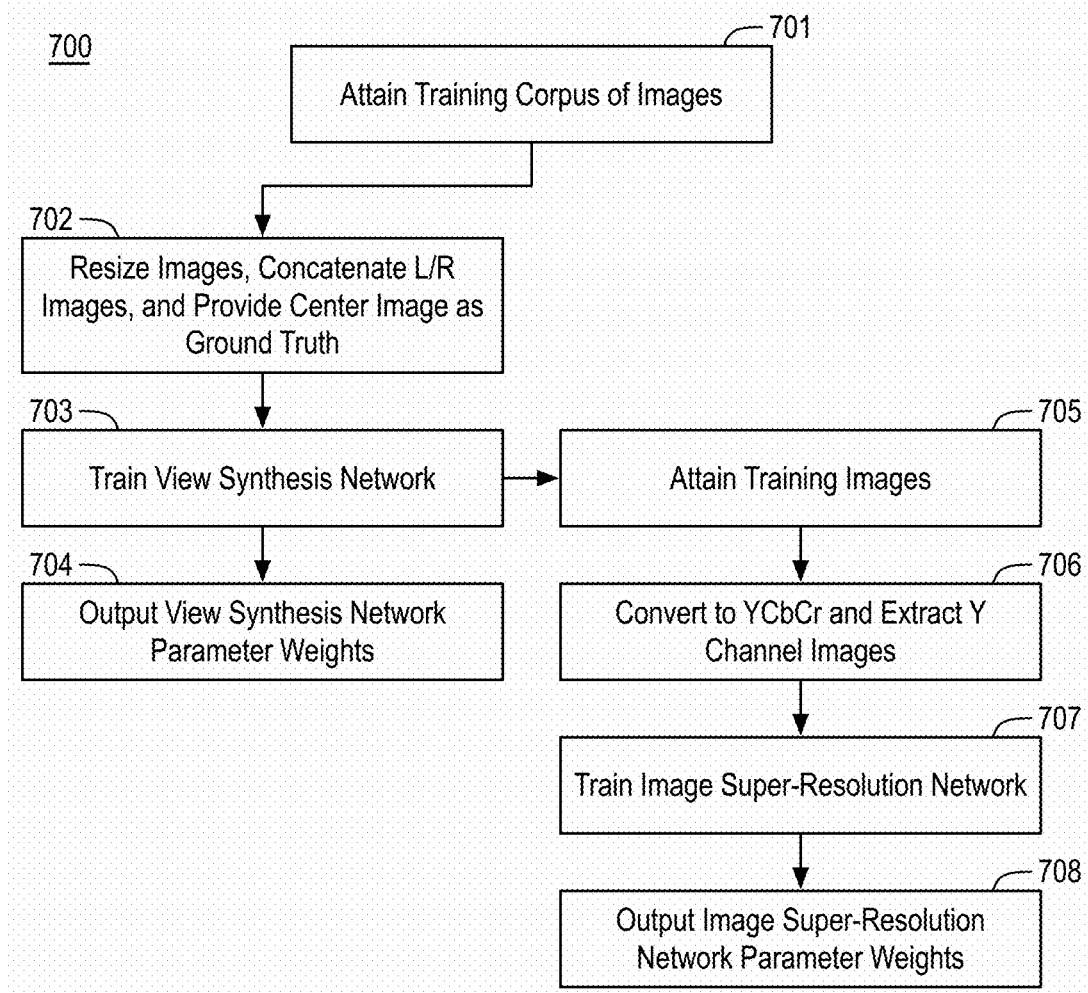
FIG. 7 is a flow diagram illustrating an example process for training a view synthesis network and an image super-resolution CNN.

FIG. 7 is a flow diagram illustrating an example process 700 for training view synthesis network 102 and image super-resolution CNN 103, arranged in accordance with at least some implementations of the present disclosure. Process 700 may include one or more operations 701-708 as illustrated in FIG. 7. Process 700 may be performed by any device or system discussed herein to train any view synthesis network and image super-resolution CNN discussed herein. Process 700 or portions thereof may be repeated for any training, training sets, etc. The parameter weights generated by process 700 may be stored to memory and implemented via a processor, for example.

Process 700 begins at operation 701, where a training corpus of images are attained. For example, the training corpus may include sets of images such that each set includes a first (e.g., left) image, a second (e.g., right) image, and an intermediate image that is of a view between the first and second images such that the intermediate image provides a ground truth for training. In an embodiment, the images of the training corpus have the same resolution and each image is an RGB image, although any suitable color space may be implemented. In an embodiment, each camera in a multi-camera system captures an RGB image of size 1920×1080 pixels and, for training view synthesis network 102, the $(n-1)^{th}$ and $(n+1)^{th}$ are used as the first and second images while the nth image is used as a ground truth intermediate image. The value of n may range from 2 to 14 for a 15 camera system although any suitable system may be used. In some embodiments, the training corpus of images may be attained from a two camera system.

Processing continues from operation 701 at operations 702-704 and, subsequently, at operations 705-708. Notably, view synthesis network 102 and image super-resolution CNN 103 are trained separately. Such training may use the same training corpus of images attained at operation 701 or the training corpuses may be different.

First with reference to operations 702-704, processing continues at operation 702, where the images of the training corpus are resized (e.g., downsampled) to any suitable size. In an embodiment, the 1920×1080 pixel RGB images discussed above are downsized to 480×288 pixel RGB images. Furthermore, the downsized first and second images (e.g., left and right or L/R images) are concatenated into input volumes as discussed herein. For example, each input volume may be 480×288×6 where 6 indicates the RGB channels for two images. Furthermore, for each input volume of first and second images, the pertinent intermediate image is provided as a ground truth image for training view synthesis network 102.

Processing continues at operation 703, where view synthesis network 102 is trained. Notably, the architecture of view synthesis network 102 (as discussed with respect to FIGS. 3 and 4) is defined and the parameter weights of the network are trained in a training phase implemented at operation 703. In an embodiment, view synthesis network 102 is trained in an end-to-end manner. In an embodiment, view synthesis network 102 parameter weights for implementation of the network, including filter weights are generated using each image training set discussed above based on back propagation training techniques. In an embodiment, the objective function for training view synthesis network 102 is the sum of the Charbonnier loss (e.g., a variant of L1 loss) and image gradient L1 loss, which is optimized using an Adam optimizer. In an embodiment, an initial learning rate is set to $10^{-5}$ and is decreased by a factor of 10 if the training loss does not change for 5 epochs until the learning rate reaches $10^{-10}$. In an embodiment, as discussed, each convolutional layer is followed by a leaky ReLU layer of slope 0.2. In an embodiment, data augmentation is performed to make the network more robust. Such data augmentation may include one or more of temporal and horizontal flipping (e.g., allowing the network to learn to predict bidirectional flow), rotation (e.g., by a randomly chosen angle of 90°, 180° or 270°, and scaling (e.g., scaling the whole image to 480×288 and/or scaling it to 640×480 and taking one or more random crops of size 480×288 from it). In an embodiment, the original images have a maximum disparity of about 250 pixels and the network is trained to handle disparity of up to 60 pixels.

Processing continues at operation 704, where the resultant parameter weights of view synthesis network 102 are output. For example, the predefined view synthesis network 102 architecture and resultant view synthesis network 102 parameter weights after training may be stored to memory and/or transmitted to another device for implementation as discussed herein.

Now with reference to operations 705-708, processing continues at operation 705, where images are attained to train image super-resolution CNN 103. Such images include a lower resolution image for upsampling and a ground truth higher resolution image. In an embodiment, the lower resolution image is generated by the application of the trained view synthesis network 102 to first and second images (after downscaling) of the training corpus attained at operation 701 and the ground truth higher resolution is the intermediate image of the first and second images (without downscaling).

Processing continues at operation 706, where the images of the training images attained at operation 706 may be converted to a color spacing having a luma channel (e.g., YCbCr, YUV, etc.) and the luma channel (Y) is extracted for training. For example, image super-resolution CNN 103 may operate on luma only images as discussed herein. In an embodiment, input images for image super-resolution CNN 103 are 480×288 luma images (e.g., having an input volume of 480×288×1) and the output and ground truth images are 1920×1080 luma images. In implementation, the resultant intermediate image is then generated by concatenating the Y channel output from image super-resolution CNN 103 with the input image CbCr channels after bicubic interpolation and converting the resultant image (e.g., in YCbCr color space) to an RGB image as discussed herein.

Processing continues at operation 707, where image super-resolution CNN 103 is trained. Notably, the architecture of image super-resolution CNN 103 (as discussed with respect to FIG. 5) is defined and the parameter weights of the network are trained in a training phase implemented at operation 707. In an embodiment, image super-resolution CNN 103 is trained in an end-to-end manner. In an embodiment, image super-resolution CNN 103 parameter weights for implementation of the network, including filter weights are generated using each image training set discussed above based on back propagation training techniques. In an embodiment, the objective function for image super-resolution CNN 103 is the sum of the Charbonnier loss (e.g., a variant of L1 loss) and image gradient L1 loss, which is optimized using an Adam optimizer. In an embodiment, an initial learning rate is set to $10^{-5}$ and is decreased by a factor of 10 if the training loss does not change for 5 epochs until the learning rate reaches $10^{-10}$. In an embodiment, data augmentation is performed to make the network more robust. Such data augmentation may include one or more of temporal and horizontal flipping, rotation, and scaling.

Processing continues at operation 708, where the resultant parameter weights of image super-resolution CNN 103 are output. For example, the predefined image super-resolution CNN 103 architecture and resultant image super-resolution CNN 103 parameter weights after training may be stored to memory and/or transmitted to another device for implementation as discussed herein.

Figure 8:
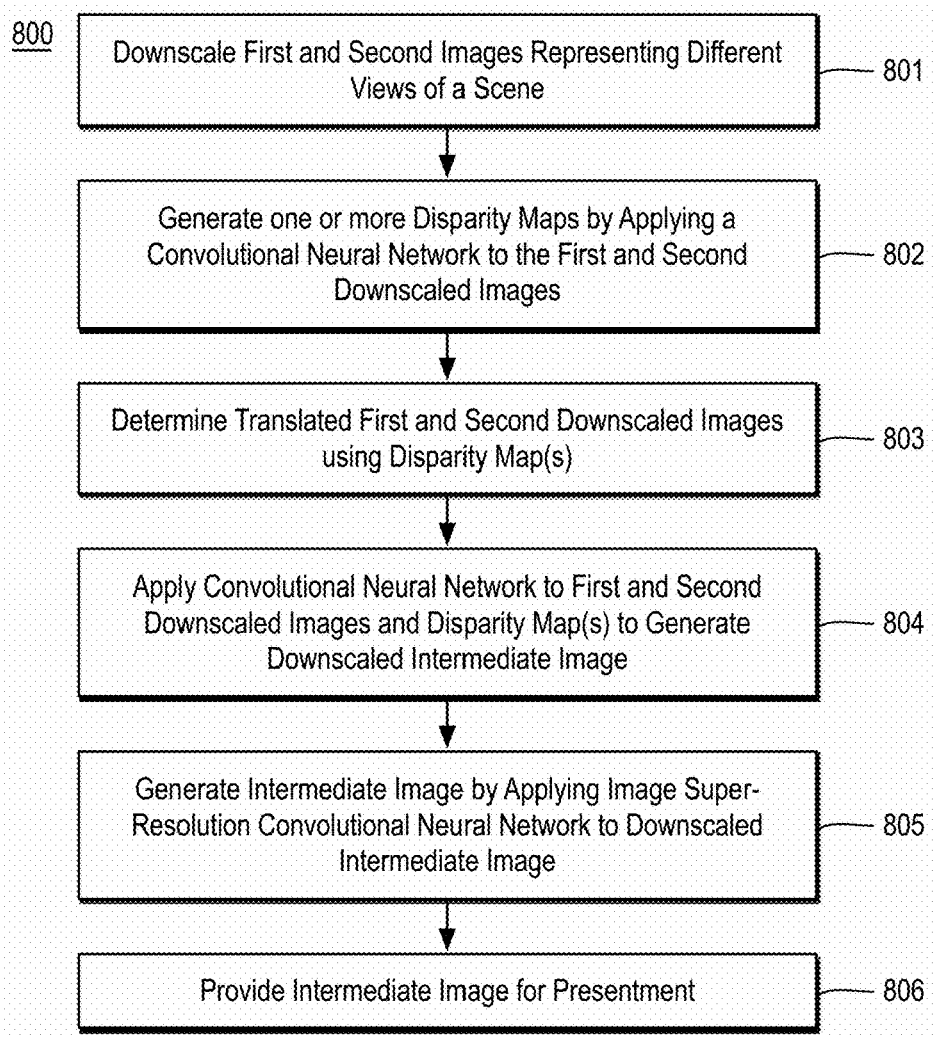
FIG. 8 is a flow diagram illustrating an example process for generating an intermediate image from multi-view images.

FIG. 8 is a flow diagram illustrating an example process 800 for generating an intermediate image from multi-view images, arranged in accordance with at least some implementations of the present disclosure. Process 800 may include one or more operations 801-806 as illustrated in FIG. 8. Process 800 may form at least part of an intermediate image generation process. By way of non-limiting example, process 800 may form at least part of an intermediate image generation process performed by device 100 as discussed herein during an implementation phase. Furthermore, process 800 will be described herein with reference to system 900 of FIG. 9.

Figure 9:
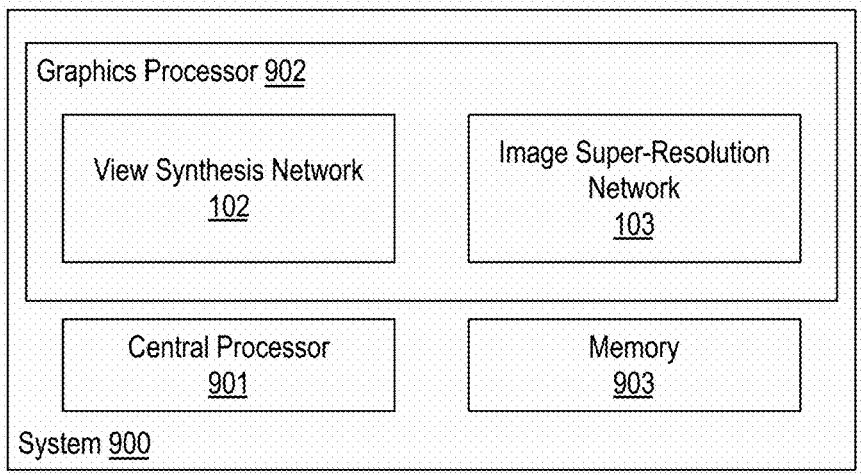
FIG. 9 is an illustrative diagram of an example system for generating an intermediate image from multi-view images.

FIG. 9 is an illustrative diagram of an example system 900 for generating an intermediate image from multi-view images, arranged in accordance with at least some implementations of the present disclosure. As shown in FIG. 9, system 900 may include one or more central processing units (CPU) 901 (i.e., central processor(s)), a graphics processing unit 902 (i.e., graphics processor), and memory stores 903. Also as shown, graphics processing unit 902 may include or implement view synthesis network 102 and image super-resolution CNN 103. Such modules may be implemented to perform operations as discussed herein. In the example of system 900, memory stores 903 may store input image data, downscaled image data, CNN characteristics and parameters data, feature maps, feature images, disparity maps, or any other data or data structure discussed herein.

As shown, in some examples, view synthesis network 102 and image super-resolution CNN 103 are implemented via graphics processing unit 902. In other examples, one or both or portions of view synthesis network 102 and image super-resolution CNN 103 are implemented via central processing units 901 or an image processing unit (not shown) of system 900. In yet other examples, one or both or portions of view synthesis network 102 and image super-resolution CNN 103 may be implemented via an imaging processing pipeline, graphics pipeline, or the like.

Graphics processing unit 902 may include any number and type of graphics processing units that may provide the operations as discussed herein. Such operations may be implemented via software or hardware or a combination thereof. For example, graphics processing unit 902 may include circuitry dedicated to manipulate image data, CNN data, etc. obtained from memory stores 903. Central processing units 901 may include any number and type of processing units or modules that may provide control and other high level functions for system 900 and/or provide any operations as discussed herein. Memory stores 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 903 may be implemented by cache memory. In an embodiment, one or both or portions of view synthesis network 102 and image super-resolution CNN 103 are implemented via an execution unit (EU) of graphics processing unit 902. The EU may include, for example, programmable logic or circuitry such as a logic core or cores that may provide a wide array of programmable logic functions. In an embodiment, one or both or portions of view synthesis network 102 and image super-resolution CNN 103 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or both or portions of view synthesis network 102 and image super-resolution CNN 103 are implemented via an application specific integrated circuit (ASIC). The ASIC may include an integrated circuitry customized to perform the operations discussed herein.

Returning to discussion of FIG. 8, process 800 begins at operation 801, where first and second images are downscaled to provide first and second downscaled images such that the first and second images are of different views of a scene and are at a first resolution. The first and second images may be downscaled using any suitable technique or techniques. As discussed, such downscaling prior to disparity map generation advantageously provides for increased disparity capability at reduced computation complexity.

Processing continues at operation 802, where at least one disparity map is generated by applying a first convolutional neural network to a first input volume including the first and second downscaled images such that the disparity map includes disparity values to translate the first and second downscaled images. In an embodiment, the first convolutional neural network is a first encoder-decoder convolutional neural network and generating the at least one disparity map includes applying the first encoder-decoder convolutional neural network to the first input volume to generate first and second disparity maps. In an embodiment, the first encoder-decoder convolutional neural network includes an encoder portion having encoder layers to extract features from the first input volume at differing resolutions and a decoder portion to combine the extracted features using skip connections corresponding to ones of the encoder layers to estimate optical flow.

In an embodiment, the first convolutional neural network comprises a first encoder-decoder convolutional neural network generating the at least one disparity map which includes applying the first encoder-decoder convolutional neural network to the first input volume to generate first and second disparity maps, translating the first and second downscaled images using the first and second disparity maps to generate third and fourth translated downscaled images, and applying a second encoder-decoder convolutional neural network to a third input volume comprising the third and fourth translated downscaled images to generate the at least one disparity map. In an embodiment, the first and second encoder-decoder convolutional neural networks have the same architecture and implement the same neural network weights. In an embodiment, the first and second encoder-decoder convolutional neural networks each include an encoder portion having encoder layers to extract features from the first and third input volumes at differing resolutions and a decoder portion to combine the extracted features using skip connections corresponding to ones of the encoder layers to estimate optical flow.

Processing continues at operation 803, where first and second translated downscaled images are determined based at least in part on the disparity map. The first and second translated downscaled images may be determined using any suitable technique or techniques such as applying the disparity map to the first and second downscaled images to translate the first and second downscaled images to the first and second translated downscaled images.

Processing continues at operation 804, where a second convolutional neural network is applied to a second input volume comprising the first and second translated downscaled images and the disparity map to generate a downscaled intermediate image comprising a view between the first and second translated downscaled images. The second convolutional neural network may include any suitable convolutional neural network. In an embodiment, the second convolutional neural network is a volumetric convolutional neural network. Operations 803 and 804 thereby generate an intermediate image at downscaled resolution using first and second downscaled images.

Processing continues at operation 805, where an intermediate image at the first resolution (e.g., at the resolution of the input left and right images) is generated based at least in part on applying an image super-resolution convolutional neural network to the downscaled intermediate image. The image super-resolution convolutional neural network upscales the downscaled intermediate image to the original resolution. The image super-resolution convolutional neural network may include any suitable convolutional neural network and may be applied using any suitable technique or techniques. In an embodiment, applying the image super-resolution convolutional neural network includes applying, to the downscaled intermediate image, multiple adjacent convolutional layers and a deconvolutional layer following the multiple adjacent convolutional layers to generate a feature image at a second resolution greater than a third resolution of the downscaled intermediate image, upsampling the downscaled intermediate image to generate a second intermediate image at the second resolution, and combining the feature image and the second intermediate image to generate an upsampled intermediate image. In an embodiment, the upsampled intermediate image is at the first resolution. In an embodiment, the multiple adjacent convolutional layers are separated into blocks, such that each block comprises a predetermined number of convolutional layers and each block implements the same neural network weights, and such that residual connections are provided between each block of convolutional layers with the residual connections to combine inputs and outputs of each block.

In an embodiment, applying the image super-resolution convolutional neural network further includes applying, to the upsampled intermediate image discussed above, multiple second adjacent convolutional layers and a second deconvolutional layer following the multiple second adjacent convolutional layers to generate a second feature image at the first resolution, upsampling the upsampled intermediate image to generate a third intermediate image at the first resolution, and combining the second feature image and the third intermediate image to generate a final upsampled intermediate image. In an embodiment, the final upsampled intermediate image is at the first resolution In an embodiment, the image super-resolution convolutional neural network is applied to only a luma channel and the downscaled intermediate image is in a first color space. In an embodiment, process 800 further includes converting the downscaled intermediate image to a second color space including a luma channel and one or more second channels, separating the luma channel and the one or more second channels such that the image super-resolution convolutional neural network is applied to only the luma channel of the downscaled intermediate image, upscaling the one or more second channels of the downscaled intermediate images, and concatenating an output image of the image super-resolution convolutional neural network having only a luma channel with the upscaled one or more second channels of the downscaled intermediate images to generate the intermediate image.

Processing continues at operation 806, where the intermediate image is provided for presentment to a viewer. The intermediate image may be provided for presentment to a viewer or user by, for example, the transmitting intermediate image to a display device, storing the intermediate image to memory for later presentment, or transferring the intermediate image to another device for presentment.

In an embodiment, the discussed neural networks are pretrained. In an embodiment, process 800 further includes separately training the view synthesis network and the image super-resolution convolutional neural network to determine view synthesis network parameters and image super-resolution convolutional neural network parameters such that the view synthesis network comprises the first convolutional neural network and the second convolutional neural network. In an embodiment, the first convolutional neural network is an encoder-decoder convolutional neural network, the encoder-decoder convolutional neural network includes an encoder portion having encoder layers to extract features from the first input volume at differing resolutions and a decoder portion to combine the extracted features using skip connections corresponding to ones of the encoder layers to estimate optical flow, the second convolutional neural network is a volumetric convolutional neural network, and the image super-resolution convolutional neural network includes multiple adjacent convolutional layers and a deconvolutional layer following the multiple adjacent convolutional layers to generate a feature image at a second resolution greater than a third resolution of the downscaled intermediate image, an upsampler to upsample the downscaled intermediate image to generate a second intermediate image at the second resolution, and an adder to combine the feature image and the second intermediate image to generate an upsampled intermediate image.

Process 800 may provide for generating an intermediate image based on multi-view images. Process 800 may be repeated any number of times either in series or in parallel for any number of input multi-view images, multi-view pictures, multi-view video pictures or frames, or the like.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
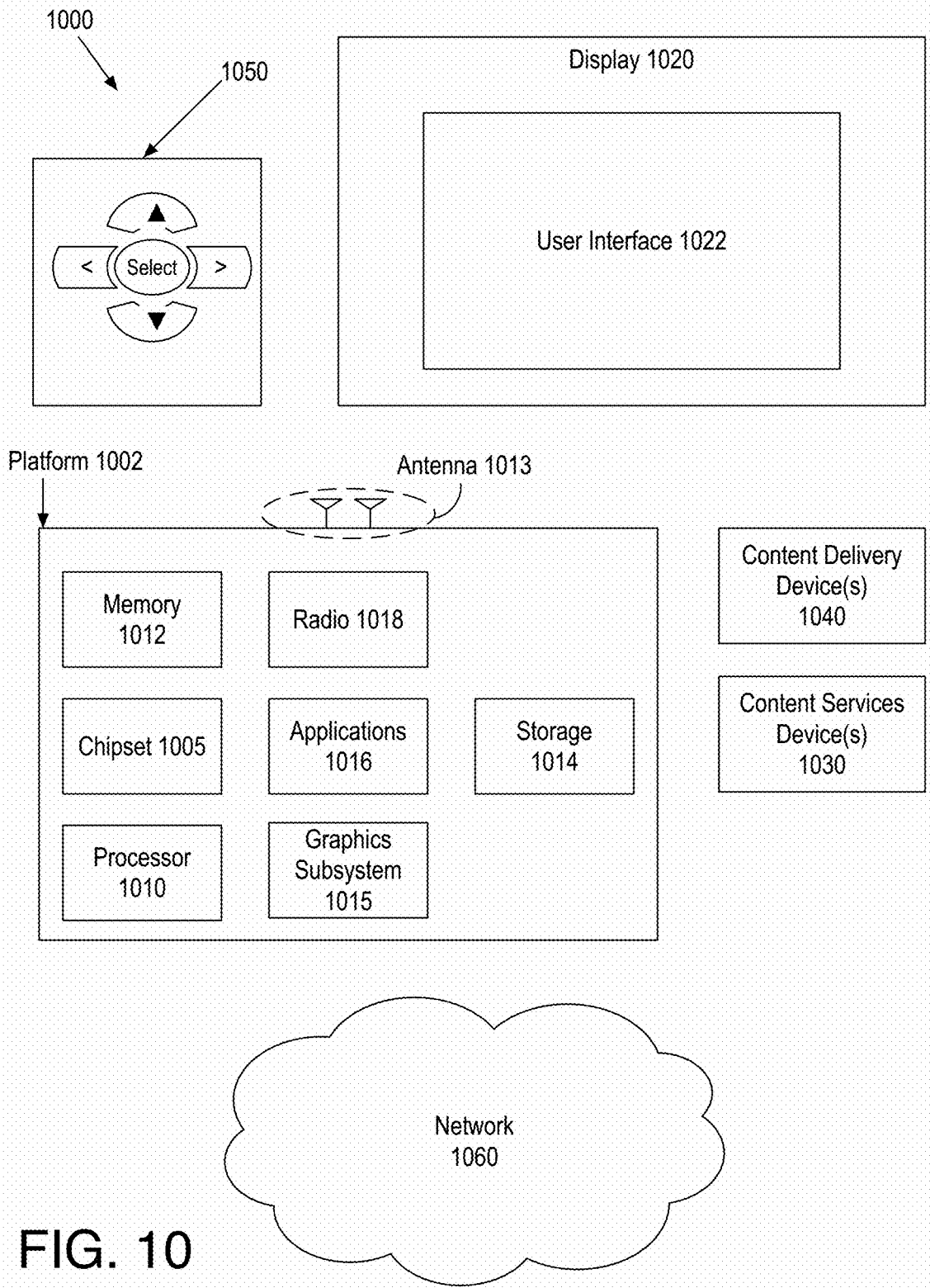
FIG. 10 is an illustrative diagram of an example system.

FIG. 10 is an illustrative diagram of an example system 1000, arranged in accordance with at least some implementations of the present disclosure. In various implementations, system 1000 may be a computing system although system 1000 is not limited to this context. For example, system 1000 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1000 includes a platform 1002 coupled to a display 1020. Platform 1002 may receive content from a content device such as content services device(s) 1030 or content delivery device(s) 1040 or other similar content sources such as a camera or camera module or the like. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still images, graphics, or video for display. Graphics subsystem 1015 may be a graphics processing unit (GPU), a visual processing unit (VPU), or an image processing unit, for example. In some examples, graphics subsystem 1015 may perform scanned image rendering as discussed herein. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any flat panel monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 10.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
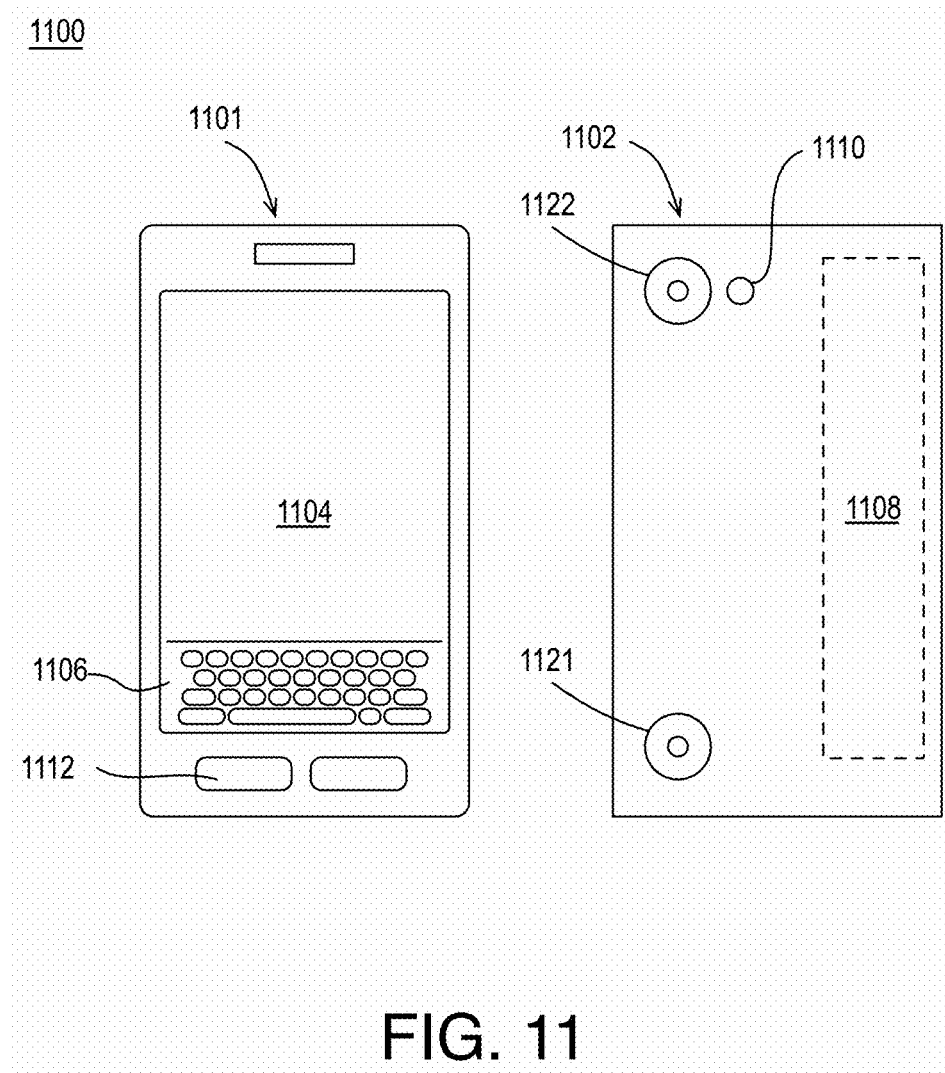
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other systems, components, or modules discussed herein or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, a color camera 1121, a color camera 1122, and an integrated antenna 1108. For example, color camera 1121 and color camera 1122 and may input image data (e.g., left and right images) as discussed herein. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include color cameras 1121, 1122, and a flash 1110 integrated into back 1102 (or elsewhere) of device 1100. In other examples, color cameras 1121, 1122, and flash 1110 may be integrated into front 1101 of device 1100 or both front and back sets of cameras may be provided. Color cameras 1121, 1122 and a flash 1110 may be components of a camera module to originate color image data that may be processed into an image or streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for implementing a convolutional neural network (CNN) comprising:
    a memory to store first and second images, wherein the first and second images comprise different views of a scene and are at a first resolution; and
    a processor coupled to the memory, the processor to:
        downscale the first and second images to provide first and second downscaled images;
        generate at least one disparity map based at least in part on applying a first convolutional neural network to a first input volume comprising the first and second downscaled images, wherein the disparity map comprises disparity values to translate the first and second downscaled images;
        determine first and second translated downscaled images based at least in part on the disparity map;
        apply a second convolutional neural network to a second input volume comprising the first and second translated downscaled images and the disparity map to generate a downscaled intermediate image comprising a view between the first and second translated downscaled images;
        generate the intermediate image at the first resolution based at least in part on applying an image super-resolution convolutional neural network to the downscaled intermediate image; and
        providing the intermediate image for presentment to a viewer.

2. The system of claim 1, wherein the first convolutional neural network comprises a first encoder-decoder convolutional neural network, and wherein the processor to generate the at least one disparity map comprises the processor to:
    apply the first encoder-decoder convolutional neural network to the first input volume to generate first and second disparity maps;
    translate the first and second downscaled images using the first and second disparity maps to generate third and fourth translated downscaled images; and
    apply a second encoder-decoder convolutional neural network to a third input volume comprising the third and fourth translated downscaled images to generate the at least one disparity map.

3. The system of claim 2, wherein the first and second encoder-decoder convolutional neural networks have the same architecture and implement the same neural network weights.

4. The system of claim 3, wherein the first and second encoder-decoder convolutional neural networks each comprise an encoder portion having encoder layers to extract features from the first and third input volumes at differing resolutions and a decoder portion to combine the extracted features using skip connections corresponding to ones of the encoder layers to estimate optical flow.

5. The system of claim 1, wherein the first convolutional neural network comprises an encoder-decoder convolutional neural network, the processor to generate the at least one disparity map comprises the processor to apply the encoder-decoder convolutional neural network to the first input volume to generate first and second disparity maps, and the first encoder-decoder convolutional neural network comprises an encoder portion having encoder layers to extract features from the first input volume at differing resolutions and a decoder portion to combine the extracted features using skip connections corresponding to ones of the encoder layers to estimate optical flow.

6. The system of claim 1, wherein the second convolutional neural network comprises a volumetric convolutional neural network.

7. The system of claim 1, wherein the processor to apply the image super-resolution convolutional neural network comprises the processor to:
apply, to the downscaled intermediate image, a plurality of adjacent convolutional layers and a deconvolutional layer following the plurality of adjacent convolutional layers to generate a feature image at a second resolution greater than a third resolution of the downscaled intermediate image;
upsample the downscaled intermediate image to generate a second intermediate image at the second resolution; and
combine the feature image and the second intermediate image to generate an upsampled intermediate image.

8. The system of claim 7, wherein the plurality of adjacent convolutional layers are separated into blocks, wherein each block comprises a predetermined number of convolutional layers and each block implements the same neural network weights, and wherein residual connections are provided between each block of convolutional layers, the residual connections to combine inputs and outputs of each block.

9. The system of claim 7, wherein the processor to apply the image super-resolution convolutional neural network further comprises the processor to:
apply, to the upsampled intermediate image, a plurality of second adjacent convolutional layers and a second deconvolutional layer following the plurality of second adjacent convolutional layers to generate a second feature image at the first resolution;
upsample the upsampled intermediate image to generate a third intermediate image at the first resolution; and
combine the second feature image and the third intermediate image to generate a final upsampled intermediate image.

10. The system of claim 1, wherein the downscaled intermediate image is in a first color space, the processor further to:
convert the downscaled intermediate image to a second color space comprising a luma channel and one or more second channels;
separate the luma channel and the one or more second channels, wherein the image super-resolution convolutional neural network is applied to only the luma channel of the downscaled intermediate image;
upscale the one or more second channels of the downscaled intermediate images; and
concatenate an output image of the image super-resolution convolutional neural network having only a luma channel with the upscaled one or more second channels of the downscaled intermediate images to generate the intermediate image.

11. The system of claim 1, the processor further to:
separately train the view synthesis network and the image super-resolution convolutional neural network to determine view synthesis network parameters and image super-resolution convolutional neural network parameters, wherein the view synthesis network comprises the first convolutional neural network and the second convolutional neural network.

12. The system of claim 1, wherein the first convolutional neural network comprises an encoder-decoder convolutional neural network, the encoder-decoder convolutional neural network comprises an encoder portion having encoder layers to extract features from the first input volume at differing resolutions and a decoder portion to combine the extracted features using skip connections corresponding to ones of the encoder layers to estimate optical flow, the second convolutional neural network comprises a volumetric convolutional neural network, and the image super-resolution convolutional neural network comprises a plurality of adjacent convolutional layers and a deconvolutional layer following the plurality of adjacent convolutional layers to generate a feature image at a second resolution greater than a third resolution of the downscaled intermediate image, an upsampler to upsample the downscaled intermediate image to generate a second intermediate image at the second resolution, and an adder to combine the feature image and the second intermediate image to generate an upsampled intermediate image.

13. A computer-implemented method for generating an intermediate image from multi-view images comprising:
downscaling first and second images to provide first and second downscaled images, wherein the first and second images comprise different views of a scene and are at a first resolution;
generating at least one disparity map based at least in part on applying a first convolutional neural network to a first input volume comprising the first and second downscaled images, wherein the disparity map comprises disparity values to translate the first and second downscaled images;
determining first and second translated downscaled images based at least in part on the disparity map;
applying a second convolutional neural network to a second input volume comprising the first and second translated downscaled images and the disparity map to generate a downscaled intermediate image comprising a view between the first and second translated downscaled images;
generating the intermediate image at the first resolution based at least in part on applying an image super-resolution convolutional neural network to the downscaled intermediate image; and
providing the intermediate image for presentment to a viewer.

14. The method of claim 13, wherein the first convolutional neural network comprises a first encoder-decoder convolutional neural network, and wherein generating the at least one disparity map comprises:
applying the first encoder-decoder convolutional neural network to the first input volume to generate first and second disparity maps;
translating the first and second downscaled images using the first and second disparity maps to generate third and fourth translated downscaled images; and
applying a second encoder-decoder convolutional neural network to a third input volume comprising the third and fourth translated downscaled images to generate the at least one disparity map.

15. The method of claim 14, wherein the first and second encoder-decoder convolutional neural networks have the same architecture and implement the same neural network weights, and wherein the first and second encoder-decoder convolutional neural networks each comprise an encoder portion having encoder layers to extract features from the first and third input volumes at differing resolutions and a decoder portion to combine the extracted features using skip connections corresponding to ones of the encoder layers to estimate optical flow.

16. The method of claim 13, wherein applying the image super-resolution convolutional neural network comprises:
applying, to the downscaled intermediate image, a plurality of adjacent convolutional layers and a deconvolutional layer following the plurality of adjacent convolutional layers to generate a feature image at a second resolution greater than a third resolution of the downscaled intermediate image;
upsampling the downscaled intermediate image to generate a second intermediate image at the second resolution; and
combining the feature image and the second intermediate image to generate an upsampled intermediate image.

17. The method of claim 16, wherein the plurality of adjacent convolutional layers are separated into blocks, wherein each block comprises a predetermined number of convolutional layers and each block implements the same neural network weights, and wherein residual connections are provided between each block of convolutional layers, the residual connections to combine inputs and outputs of each block.

18. The method of claim 16, wherein applying the image super-resolution convolutional neural network further comprises:
applying, to the upsampled intermediate image, a plurality of second adjacent convolutional layers and a second deconvolutional layer following the plurality of second adjacent convolutional layers to generate a second feature image at the first resolution;
upsampling the upsampled intermediate image to generate a third intermediate image at the first resolution; and
combining the second feature image and the third intermediate image to generate a final upsampled intermediate image.

19. At least one machine readable medium comprising a plurality of instructions that, in response to being executed on a computing device, cause the computing device to generate an intermediate image from multi-view images by:
downscaling first and second images to provide first and second downscaled images, wherein the first and second images comprise different views of a scene and are at a first resolution;
generating at least one disparity map based at least in part on applying a first convolutional neural network to a first input volume comprising the first and second downscaled images, wherein the disparity map comprises disparity values to translate the first and second downscaled images;
determining first and second translated downscaled images based at least in part on the disparity map;
applying a second convolutional neural network to a second input volume comprising the first and second translated downscaled images and the disparity map to generate a downscaled intermediate image comprising a view between the first and second translated downscaled images;
generating the intermediate image at the first resolution based at least in part on applying an image super-resolution convolutional neural network to the downscaled intermediate image; and
providing the intermediate image for presentment to a viewer.

20. The machine readable medium of claim 19, wherein the first convolutional neural network comprises a first encoder-decoder convolutional neural network, and wherein generating the at least one disparity map comprises:
applying the first encoder-decoder convolutional neural network to the first input volume to generate first and second disparity maps;
translating the first and second downscaled images using the first and second disparity maps to generate third and fourth translated downscaled images; and
applying a second encoder-decoder convolutional neural network to a third input volume comprising the third and fourth translated downscaled images to generate the at least one disparity map.

21. The machine readable medium of claim 20, wherein the first and second encoder-decoder convolutional neural networks have the same architecture and implement the same neural network weights, and wherein the first and second encoder-decoder convolutional neural networks each comprise an encoder portion having encoder layers to extract features from the first and third input volumes at differing resolutions and a decoder portion to combine the extracted features using skip connections corresponding to ones of the encoder layers to estimate optical flow.

22. The machine readable medium of claim 19, wherein applying the image super-resolution convolutional neural network comprises:
applying, to the downscaled intermediate image, a plurality of adjacent convolutional layers and a deconvolutional layer following the plurality of adjacent convolutional layers to generate a feature image at a second resolution greater than a third resolution of the downscaled intermediate image;
upsampling the downscaled intermediate image to generate a second intermediate image at the second resolution; and
combining the feature image and the second intermediate image to generate an upsampled intermediate image.

23. The machine readable medium of claim 22, wherein the plurality of adjacent convolutional layers are separated into blocks, wherein each block comprises a predetermined number of convolutional layers and each block implements the same neural network weights, and wherein residual connections are provided between each block of convolutional layers, the residual connections to combine inputs and outputs of each block.

24. The machine readable medium of claim 22, wherein applying the image super-resolution convolutional neural network further comprises:
applying, to the upsampled intermediate image, a plurality of second adjacent convolutional layers and a second deconvolutional layer following the plurality of second adjacent convolutional layers to generate a second feature image at the first resolution;
upsampling the upsampled intermediate image to generate a third intermediate image at the first resolution; and
combining the second feature image and the third intermediate image to generate a final upsampled intermediate image.

* * * * *